(12) United States Patent
Yeh

(10) Patent No.: US 9,542,090 B2
(45) Date of Patent: Jan. 10, 2017

(54) ELECTRONIC DEVICE, PROCESSING MODULE, AND METHOD FOR DETECTING TOUCH TRACE STARTING BEYOND TOUCH AREA

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 174 days.

(21) Appl. No.: 14/273,698

(22) Filed: May 9, 2014

(65) Prior Publication Data

US 2014/0333557 A1 Nov. 13, 2014

(30) Foreign Application Priority Data

May 10, 2013 (TW) .............................. 102116626 A

(51) Int. Cl.
*G06F 3/041* (2006.01)
*G06F 3/0488* (2013.01)

(52) U.S. Cl.
CPC ........... *G06F 3/0488* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2005/0046621 A1* | 3/2005 | Kaikuranta | G06F 3/03547 345/173 |
| 2011/0167369 A1* | 7/2011 | van Os | G06F 3/0483 715/769 |
| 2012/0218215 A1* | 8/2012 | Kleinert | G06F 3/0418 345/173 |
| 2012/0236037 A1 | 9/2012 | Lessing et al. | |
| 2012/0327009 A1* | 12/2012 | Fleizach | G06F 3/04883 345/173 |
| 2013/0145295 A1* | 6/2013 | Bocking | G06F 3/017 715/764 |
| 2013/0159941 A1* | 6/2013 | Langlois | G06F 3/017 715/863 |

* cited by examiner

*Primary Examiner* — Andrew Sasinowski
*Assistant Examiner* — Henok Heyi
(74) *Attorney, Agent, or Firm* — WPAT, PC; Justin King; Siying Chen

(57) ABSTRACT

The present invention provides a method for detecting a touch trace starting beyond a touch area. The method comprises the following steps: receiving touch events happened in the touch area detected by a touch module; plotting a touch trace according to the touch events outputted from the touch module; determining whether a first touch trace beginning with a first point as the touch trace starting beyond the touch area; and determining whether a second touch trace beginning with a second point as the touch trace starting beyond the touch area, wherein the first point is within a first range to a boundary of the touch area and the second point is within a second range to the boundary, and the second range is larger than the first range.

20 Claims, 4 Drawing Sheets

ELECTRONIC DEVICE, PROCESSING MODULE, AND METHOD FOR DETECTING TOUCH TRACE STARTING BEYOND TOUCH AREA

CROSS REFERENCE TO RELATED APPLICATIONS

This application claims priority under 35 U.S.C 119 to Taiwan patent application, 102116626, filed on May 10, 2013, the disclosure of which is incorporated herein by reference.

BACKGROUND OF THE INVENTION

1. Field of the Invention

The present invention relates to an electronic device and a method making use of the same for the detection of a touch trace, and more particularly, to an electronic device and a method making use of the same for the detection of a touch trace which starts beyond the touch area.

2. Description of the Prior Art

Touch sensitive input has become one of the most common human-computer interfaces today. In particular, touch panels and touch pads are now standard input devices for modern consumer electronic products. The former is widely used in smart phones e.g. Apple's iPhone and iPad, and the later is used in laptops. In other words, the consumer electronic products today come with at least one of these two input devices. In fact, more and more laptops are provided with both, for example the new Windows 8-based products.

All touch modules come with a defined touch area, which is able to receive touch events triggered by physical contacts thereon of the user body or a stylus. The touch event, when detected by the hardware of the touch module, enables an interrupt request to the operating system so that it is informed of the coordinates in the touch area where the touch event took place. When a series of multiple touch events take place, they are associated by either the firmware of the touch module, the operating system or the higher level applications to form a touch trace. In other words, a touch trace is typically defined as a trajectory comprised of a plurality of touch events triggered by an object approaching or physically touching the touch area.

From user's view point, touch traces imply the instructions one intends to do with the computer. The present invention focuses on the touch traces with their starting points falling outside of the touch area. Take the Windows 8 operating system for example, when the user's finger is detected as sliding in the touch area from the right edge of the touch panel or touch pad, a start menu slides off the right edge of the screen so the user can manipulate. The present invention focuses on such cases but as the people skilled in the art will understand, the present invention is not limited to Microsoft's Windows operating systems.

Saving power is another trend for today's consumer electronic products. After idling for a certain amount of time, components are either shut down or set to lower their operating frequencies in order to save energy. Referring to FIG. 1, which is a diagram illustrating a conventional electronic device 100. As shown, electronic device 100 comprises a central processor 110, a bridge 120, a graphical processor 130, a memory 140, a touch module 150, and a display module 160. The central processor 110 is configured for executing an operating system, such as the above mentioned Windows 8 or Android. The operating system monitors and controls all components of the electronic device 100. The display module 160 is electrically coupled with the graphical processor 130. The touch module 150 is electrically couple with the bridge 120. The memory 140 is electrically coupled with the central processor 110. The touch module 150 may be a touch panel which works with the display module 160, or a touch pad. The electronic device 100 may further comprise keyboard, mouse, hard drive and networking unit, etc. These components are neglected herein for simplicity.

When the operating system detects that the electronic device 100 has been idle for a while, it instructs individual component to take energy conservation actions. For example, the display module 160 may first dim to save power, and shut down the screen eventually. The graphical processor 130, which controls the display module 160, may lower its operating frequency, and even shut down completely following the display unit 160. The touch module 150 can also lower its scanning frequency first and the internal operating frequency of the circuits, and finally shut down completely. The operating system can instruct the central processor 110 to lower its operating frequency. In other words, for different power saving modes, individual component of the electronic device 100 can be set to different power saving work modes. As long as one single component is in its power saving mode, the overall power consumption of the electronic device 100 is reduced as compared to the normal work mode.

The electronic device 100 can restore from the power saving mode upon receipt of a trigger event. The trigger event may be a package sent from the network, or completion of a preset counter in the central processor 110. The most common trigger event that awakes the electronic device 100 is an input event triggered by the input unit(s), such as the keyboard, mouse, or the touch module 150.

Having to stand by for the user's input, the input units of the electronic device 100 restore from and then enter the hibernation mode periodically. For example, the user's touch action typically spans at least a tiny fraction of a second, therefore the touch module 150 can come back to normal work mode every dozens of milliseconds from hibernation mode and scan the touch area. If an input has taken place, the touch module 150 reports it to the bridge 120 and central processor 110, so that the operating system brings the entire electronic device 100 back to the normal work mode.

Referring to FIG. 2, which is a diagram illustrating working status of the touch module 150 in the power saving mode. In the upper half part (a) of FIG. 2, a scenario is illustrated where no touch action by the user are detected over the time span observed. As shown, to save power while keeping detecting for the user's inputs, the touch module 150 recovers to the work (detecting) mode from hibernation periodically, to detect whether there is an object approaching or physically touching the touch area. If no object is detected to be approaching or touching the touch area, the touch module 150 hibernates again, and so on.

In the lower half part (b) of FIG. 2, the user made a touch input action starting outside of the touch area, to both wake up the electronic device 100 and instruct it to execute the instructions suggested by such action (for example, in Windows 8, a start menu may slide off the edge of the screen as a response). In this touch action, the very first contact is made outside of the touch area of the touch module 150, at time T0 (not shown). The contact continues and enters the touch area at time T1. At this moment, the touch module 150 is still in hibernation and is unaware of the contact in the touch area. After the touch module 150 wakes up as scheduled, it detects touch contact at time T2. The detection of contact prevents the touch module 150 from hibernating again and keeps it in the work mode. As a result, another contact made by the same touch action is detected at time T3.

In certain circumstances, the location of contact detected at T2 may already be far away from the edge of the touch area. In such case, the touch module 150 will not consider the touch input action to be taking place outside of the touch area. The operating system will then associate the touch events of T2 and T3 into a touch trace which starts within the touch area, and responds accordingly. As a result, the user will not get responses he expected to see i.e. actions corresponding to the "intended" touch trace, which started outside of the touch area, but ones corresponding to a touch trace starting inside the touch area instead.

Therefore, a device and method is desired for correctly detecting a touch trace starting outside of the touch area under the power saving mode, so that the user can get the right responses.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

The present invention provides a device and method making use of the same to correctly detect touch traces starting outside (or say beyond) the touch area, so that the user can get the right responses from the associated electronic device.

In one embodiment of the present invention, an electronic device is provided, which is able to detect touch traces starting beyond an associated touch area that works with the provided electronic device. The provided electronic device comprises a touch module and a processing module. The touch module detects touch events taking place in the touch area. The processing module is electrically coupled to the touch module and plots touch traces that take place in the touch area according to the touch events outputted from the touch module. When the touch module has been in the detecting mode more than a time period, the processing module determines whether a first touch trace, which started at a first point, started beyond the touch area. Further, while the touch module is in the detecting mode within the time period, the processing module determines whether a second touch trace, which started at a second point, started beyond the touch area. The distance between the first point and the edge, or say boundary, of the touch area is determined to be within a first range, and the distance between the second point and the boundary of the touch area is determined to be within a second range, wherein the second range is larger than the first range.

In another embodiment of the present invention, an electronic device is provided for detecting touch traces with their starting point outside of an associated touch area that works with the provided electronic device. The provided electronic device comprises a touch module and a processing module. The touch module detects touch events taking place in the touch area. The processing module is electrically coupled to the touch module and plots touch traces that take place in the touch area according to the touch events outputted from the touch module. When the electronic device is in a first mode, the processing module determines whether a first touch trace, which started at a first point, started beyond the touch area. When the electronic device is in a second mode, the processing module determines whether a second touch trace, which started at a second point, started beyond the touch area. The distance between the first point and the boundary of the touch area is determined to be within a first range, and the distance between the second point and the boundary of the touch area is determined to be within a second range, wherein the second range is larger than the first range.

In another embodiment of the present invention, a processing module is provided for detecting touch traces starting beyond an associated touch area that works with the provided processing module. The processing module receives touch events outputted from a touch module, wherein the touch events are detected by the touch module as taking or having taken place in the touch area. The processing module then plots touch traces that take place in the touch area according to the touch events received from the touch module. When the touch module has been in the detecting mode for a while, the processing module determines whether a first touch trace, which started at a first point, to be one which started beyond the touch area. Further, while the touch module is in the detecting mode, the processing module determines whether a second touch trace, which started at a second point, to be one which started beyond the touch area. The distance between the first point and the boundary of the touch area is determined to be within a first range, and the distance between the second point and the boundary of the touch area is determined to be within a second range, wherein the second range is larger than the first range.

In another embodiment of the present invention, a method is provided for detecting touch traces starting beyond a touch area that works with an electronic device to which the provided method is applied. The electronic device comprises a touch module and a processing module electrically coupled with each other. The method comprises: receiving touch events outputted from the touch module, wherein the touch events are detected by the touch module as taking or having taken place in the touch area, and plotting touch traces that take place in the touch area according to the touch events received from the touch module. The method further comprises: determining, when the touch module has been in the detecting mode for a while, whether a first touch trace, which started at a first point, to be one which started beyond the touch area, and determining, while the touch module is in the detecting mode, whether a second touch trace, which started at a second point, to be one which started beyond the touch area. The distance between the first point and the boundary of the touch area is determined to be within a first range, the distance between the second point and the boundary of the touch area is determined to be within a second range, wherein the second range is larger than the first range.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
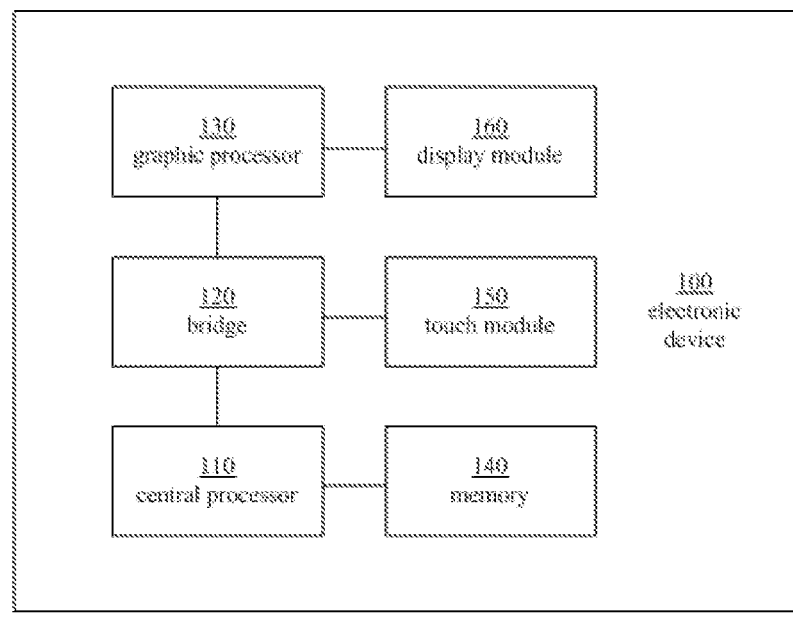
FIG. 1 is a diagram illustrating a conventional electronic device.
Figure 2:
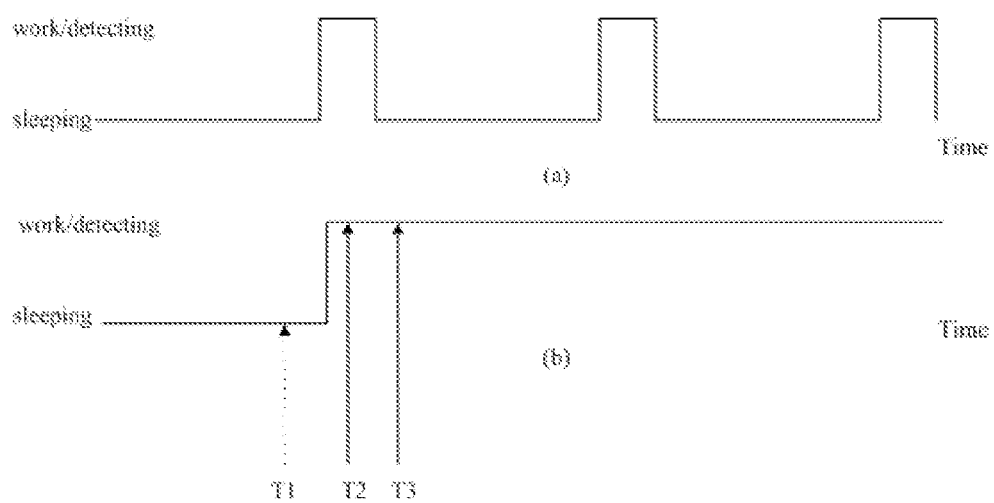
FIG. 2 is a diagram illustrating working status of a conventional touch module in the power saving mode.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 3A:
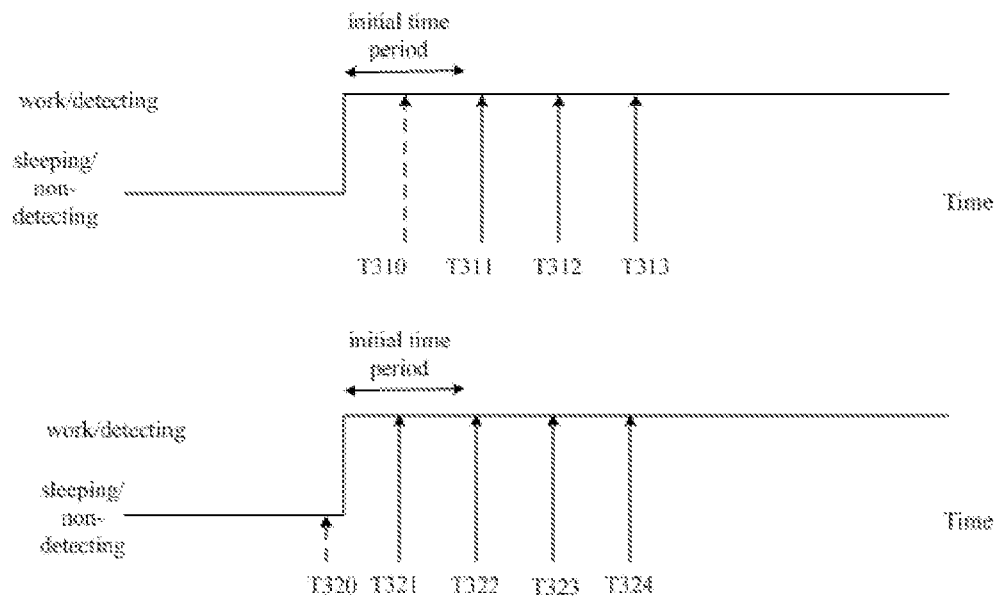
FIG. 3A is a sequence diagram of the detection of touch traces starting beyond the touch area according to one embodiment of the present invention.
Figure 3B:
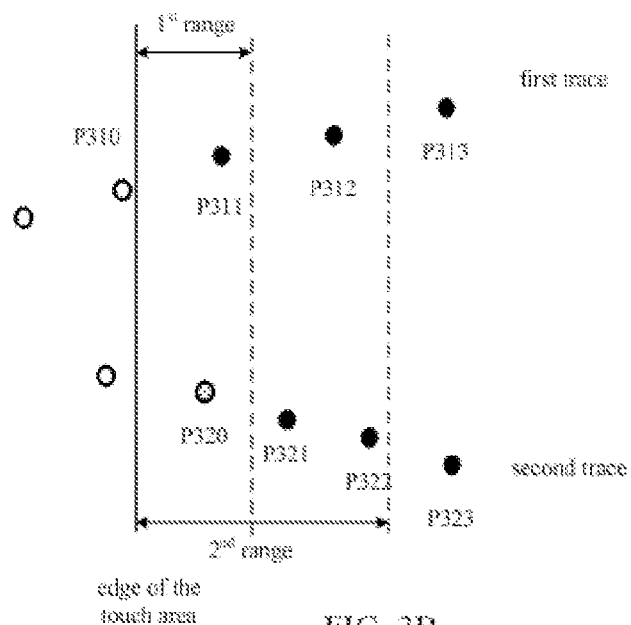
FIG. 3B is an illustration of the detection of touch traces starting beyond the touch area according to one embodiment of the present invention.

Referring to FIG. 3A and FIG. 3B, which are sequence diagrams illustrating the detection of two touch traces starting beyond the touch area, respectively, according to one embodiment of the present invention. As shown, FIG. 3A comprises two parts: the upper part is a sequence diagram for the first of the two touch traces (the first trace hereinafter), and the lower part is a sequence diagram for the second of the two touch traces (the second trace hereinafter). Similarly, the upper part of FIG. 3B is an illustrative trajectory of the first trace, and the lower is another trajectory of the second trace.

As described in the prior art, any electronic touch device, including those being according to the embodiments of the present invention, typically has two operating modes, the normal work/detecting mode and the hibernation/non-detecting mode. In the normal work mode, the electronic touch device is able to detect the touch events taking place in the touch area. In the hibernation mode, the electronic touch device is unable to detect the touch events in the touch area, but consumes less power than the normal work mode. In both parts of FIG. 3A, the touch module switches from the hibernation mode to the normal work mode i.e. from the non-detecting to the detecting mode. Why and how the touch module does such switch is irrelevant to the present invention. The switch may happen as a result of the detection of touch events, or that the operating system instructed so. Ordinary people skilled in the art understand the various possible trigger events that can render such switch, and the details will not be described herein.

In one embodiment of the present invention, when the electronic touch device is in the normal work/detecting mode, it scans the touch area periodically and detects touch events taking place at one or more touch points in the touch area. Herein, the touch point can be associated to a single point, or the center of mass (or gravity) of a contact area. People skilled in the art will understand the possible variants for the touch point, and details will not be described herein. A vertical line is shown in FIG. 3B to represent the edge, or say boundary, of the touch area. The right side of the vertical line is the touch area, and the left side of the vertical line is the non-touch area.

Attention is now drawn to the first trace. The first trace comprises touch events corresponding to touch points P311, P312, and P313, respectively. As shown, a while (a time period or a period of time) after the electronic touch device switched from the hibernation to normal work mode, at time point T311 the touch event corresponding to P311 is detected. Also, the touch events corresponding to P312 and P313 are detected at time points T312 and T313, respectively. Because the time point T311 comes after the switch to the normal work mode (after the time period), the electronic touch device checks if the distance between P311 and the boundary of the touch area is smaller than a first range. If this distance is determined to be smaller than the first range, it is suggested the touch event corresponding to P311, which is also the first touch event of the first trace, took place within the first range. In such case, the provided electronic touch device determines that the first trace started beyond the touch area. In contrast, if the distance between P311 and the boundary of the touch area is greater than the first range, the provided electronic touch device determines that the first trace started within the touch area, with the start point being P311.

It can be seen from the upper part of FIG. 3A that, the spans between the time points T311, T312 and T313 are identical. A time point T310 can be found ahead of T311 by the same time span. As shown, the touch point at T310 is P310, which is outside of the touch area. Therefore, the provided electronic touch device would not be able to detect this touch event. It is noted that although in the example shown in FIG. 3A, T310 is within a time period, ordinary people skilled in the art will understand that in the present invention, even if T310 falls outside of the initial period, a touch trace will still be determined to be one starting beyond the touch area, as long as it meets the criteria of (1) the first touch event thereof takes place after the time period, and (2) the distance between the touch point of this first touch event and the boundary of the touch area is within the first range.

Attention is now drawn to the second trace. As shown, the second trace comprises touch events corresponding to P321, P322, and P323. Within the time period where the provided electronic touch device switches from the hibernation mode to normal work mode, a touch event corresponding to P321 is detected at time point T321. As T321 is within the time period, the distance between P321, the touch point of the first touch event of the second trace, and the boundary of the touch area is checked and determined to be whether or not smaller than a second range, wherein the second range is greater than the first range. As shown, in this example the distance between P321 and the boundary of the touch area is smaller than the second range, therefore the provided electronic touch device determines that the second trace started beyond the touch area. In contrast, if the distance between P321, i.e., the point of the first touch event, and the boundary of the touch area is greater than the second range, the provided electronic touch device determines that the second trace started within the touch area, with the starting point being P321.

It can be seen from the lower part of FIG. 3A that, the spans between the time points T321, T322, and T323 are identical. A time point T320 can be found ahead of T321 by the same time span. As shown, the touch point at T320 is P320, which is within the touch area. However, as the provided electronic touch device is still in hibernation at T320, the touch event corresponding to P320 cannot be detected. In such circumstances, a determining step of touch trace speed may be added. In case the speed of the second trace exceeds a second critical speed, it is determined that the second trace started beyond the touch area no matter P320 is located inside or outside the touch area. The second critical speed is a speed of the second trace with respect to a corresponding boundary of the touch area. In an alternative embodiment, a determining step of P320 location may be added. In case P320 is determined outside the touch area, the electronic touch device needs not to perform the fore-mentioned speed determining step. Instead, in case P320 is determined inside the touch area, the electronic touch device may perform the fore-mentioned speed determining step. It is worthy noted that P320 is not the so called $0^{th}$ point. It may be a point calculated according to the P321, P322, and/or P323 as well as fixed time period.

In other words, in one embodiment, within a time period where the electronic touch device switches to working mode from hibernation mode, a touch trace, started with a first point, is determined that started beyond the touch area if the distance between the first point and a corresponding boundary of the touch area is smaller than the second distance. Although in this embodiment, it is possible to mistake a touch trace starting beyond the touch area. In real world implementations, by fine tuning the second distance and the timer period, the probability of mistaking could be reduced to an acceptable level. In an alternative embodiment, the determining step of touch trace speed could be further added to lower or eliminate the probability of mistaking. However, it costs calculation resource and time.

Figure 4:
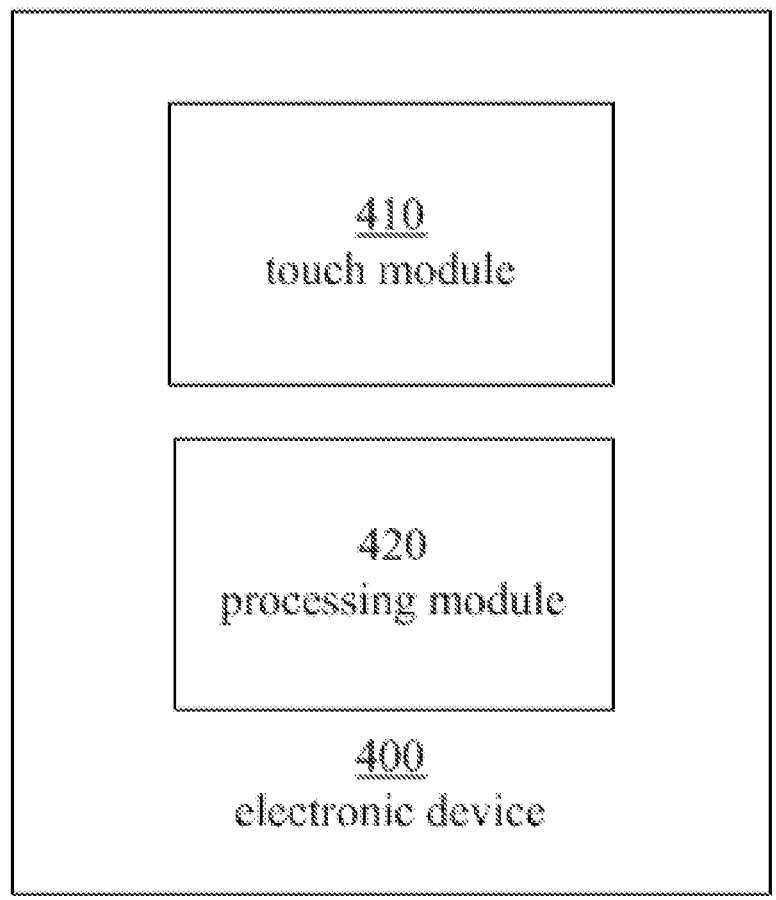
FIG. 4 is a diagram illustrating an electronic device for detecting touch traces starting beyond the touch area according to one embodiment of the present invention.

Referring to FIG. 4, which is a diagram illustrating of an electronic device 400 according to one embodiment of the present invention. The provided electronic device 400 is able to detect touch traces starting beyond an associated touch area that it works with. The electronic device 400 can be a combination of different circuits, or a single chip implementing functions of these circuits. The single chip can also be made to implement other functions. Ordinary people skilled in the art will understand the possible variants of the electronic device 400, and the details will not be described herein.

As shown, the electronic device 400 comprises a touch module 410 and a processing module 420. In one embodiment, the touch module 410 functions to detect the touch events taking place in the touch area. The processing module 420 is electrically coupled to the touch module 410, and plots touch traces taking place in the touch area according to the touch events outputted from the touch module 410. When the touch module 410 has been in the detecting (normal work) mode for a while, for example longer than a time period, the processing module 420 determines whether a first touch trace, which started at a first point, started beyond the touch area. Furthermore, while the touch module 410 is in the detecting mode within that time period, the processing module 420 determines whether a second touch trace, which started at a second point, started beyond the touch area. The distance between the first point and boundary of the touch area is determined to be within a first range, and the distance between the second point and boundary of the touch area is determined to be within a second range, wherein the second range is larger than the first range.

It has been mentioned that individual components of an electronic device can be under respective power-saving mode. In other words, the touch module 410 and processing module 420, which are configured for the detection of touch events, may switch to the normal work mode while other components remain in their power-saving mode. In another embodiment of the present invention, when the electronic device 400 is in a first mode e.g. the normal work mode, the processing module 420 determines whether a first touch trace, which started at a first point, started beyond the touch area. When the electronic device 420 is in a second mode e.g. the power-saving mode, the processing module 420 determines whether a second touch trace, which started at a second point, started beyond the touch area, wherein the distance between the first and second point to the boundary of the touch area are determined to be within a first range and second range, respectively, with the second range being larger than the first range.

As ordinary people skilled in the art can understand, when the electronic device 400 is in the second mode, the touch module 410 periodically switches back and forth between the detecting and hibernation mode. On the other hand, when the electronic device 400 is in the first mode, the touch module 410 is always in the detecting mode. In one embodiment of the present invention, the operation mode of the electronic device 400 is designated by the operating system. In another embodiment of the present invention, the operation mode of the electronic device 400 is designated by the central processor. The present invention is applicable to either case, as long as the first mode is different from the second mode. In some embodiments of present invention, the electronic device 400 is different in the first and second modes in terms of the level of power conservation or consumption.

As ordinary people skilled in the art understand, if a longer time period is set between each switch back to the detecting mode, the touch module 410 stays in the non-detecting mode for a longer time, thus a longer second range must be used to compensate for the longer distance the touching object may travel during the hibernation period, so that a touch trace started outside of the touch area will not be wrongly determined to be having started within the touch area. In contrast, a shorter second range should be used in the case of a shorter hibernation period, where the touch module 410 stays in the non-detecting mode for a shorter time. In one embodiment, the hibernation period is linearly proportional to the second range. In another embodiment, the hibernation period is non-linearly proportional to the second range.

In some embodiments, a zero-th ($0^{th}$) point of the first touch trace can be determined by the processing module 420. The $0^{th}$ point is a touch point preceding the first touch point and is in the surroundings of the touch area. Methods for the determination of the $0^{th}$ point comprise applying extrapolation to the touch events of the first touch trace. In some embodiments, a $0^{th}$ point on the second touch trace can be determined by the processing module 420. Similarly, this $0^{th}$ point is a touch point preceding the first touch point and is in the surroundings of the touch area. Methods for the determination of this $0^{th}$ point comprise applying extrapolation to the touch events of the second trace. The $0^{th}$ point herein may be generated by extrapolation according to the time spacings between the points of the second trace. Alternatively, it may be generated by extrapolation according to the relative positions between the points of the second trace. By extrapolation, a point at the boundary of the touch area could be calculated as the $0^{th}$ point. It is worthy noted that the time spacings and relative positions between some points of the second trace may be different. The present invention may apply linear function, quadratic function, and any other forms of extrapolation methods to find the $0^{th}$ point.

When the $0^{th}$ point is found, individual touch traces can be matched with one of the surroundings of the touch area wherefrom it enters the touch area. A typical touch area is a rectangle with four surrounding segments. The coordinates of the $0^{th}$ point indicates where the touch trace enters the touch area, as well as wherefrom it came along. This information is important in the sense that it implies the actions the electronic device 400 is supposed to take in response to one particular touch trace that is taking place. For instance, the surroundings of a touch area may be divided into a few segments, each corresponding to a specified responsive action with respect to an entering touch trace. Take the Android system for example. An Android system typically has three function buttons: Back, Home, and Menu. The lower surrounding of a cell phone screen is therefore typically divided into three segments, each corresponding to one of the function buttons, respectively. This allows the operating system to determine the function button selected by the user based on the particular surrounding segment wherefrom the touch trace enters the screen at the bottom.

In one embodiment, the first and second ranges are designed based on geometry of the surroundings of the touch area. For example, there may not be enough space in the surroundings for a touching finger or stylus to start a touch trace i.e. the surroundings width is too small to make a solid contact thereon.

In one embodiment, in response to that the first touch trace is determined to be one which started beyond the touch area, the processing module 420 further determines whether the speed of the first touch trace exceeds a first critical speed. The first critical speed is a speed of the first touch trace with respect to the boundary of the touch area.

In one embodiment, in response to that the second touch trace is determined to be one which started beyond the touch area, the processing module 420 further determines whether the speed of the second touch trace exceeds a second critical speed. The second critical speed is a speed of the second touch trace with respect to the boundary of the touch area.

The reason of the first and second critical speed is in screening out false conception of starting-beyond-touch-area touch traces. When the speed of a detected touch trace is too slow, it may be the case of two distinct and discontinuing touch traces close to each other, or it did not enter the touch area from outside at all. The present invention does not specify the relationship between the first and the second critical speeds. In one embodiment, the first critical speed may be equal to the second critical speed.

In summary, the processing module 420, according to one embodiment of the present invention as shown in FIG. 4, is able to detect touch traces starting beyond an associated touch area that works with the electronic device 400. The processing module 420 receives touch events outputted from the touch module 410, wherein the touch events are detected by the touch module 410 as taking or having taken place in the touch area, and plots touch traces that take place in the touch area according to the touch events received from the touch module 410. When the touch module 410 has been in the detecting mode longer than a time period, the processing module 420 determines a first touch trace, which started at a first point, to be one which started beyond the touch area. Furthermore, while the touch module 410 is in the detecting mode within that time period, the processing module 420 determines a second trace, which started at a second point, to be one which started beyond the touch area. The distance between the first point and the boundary of the touch area is determined to be within a first range, and the distance between the second point and the boundary of the touch area is determined to be within a second range, wherein the second range is larger than the first range.

Figure 5:
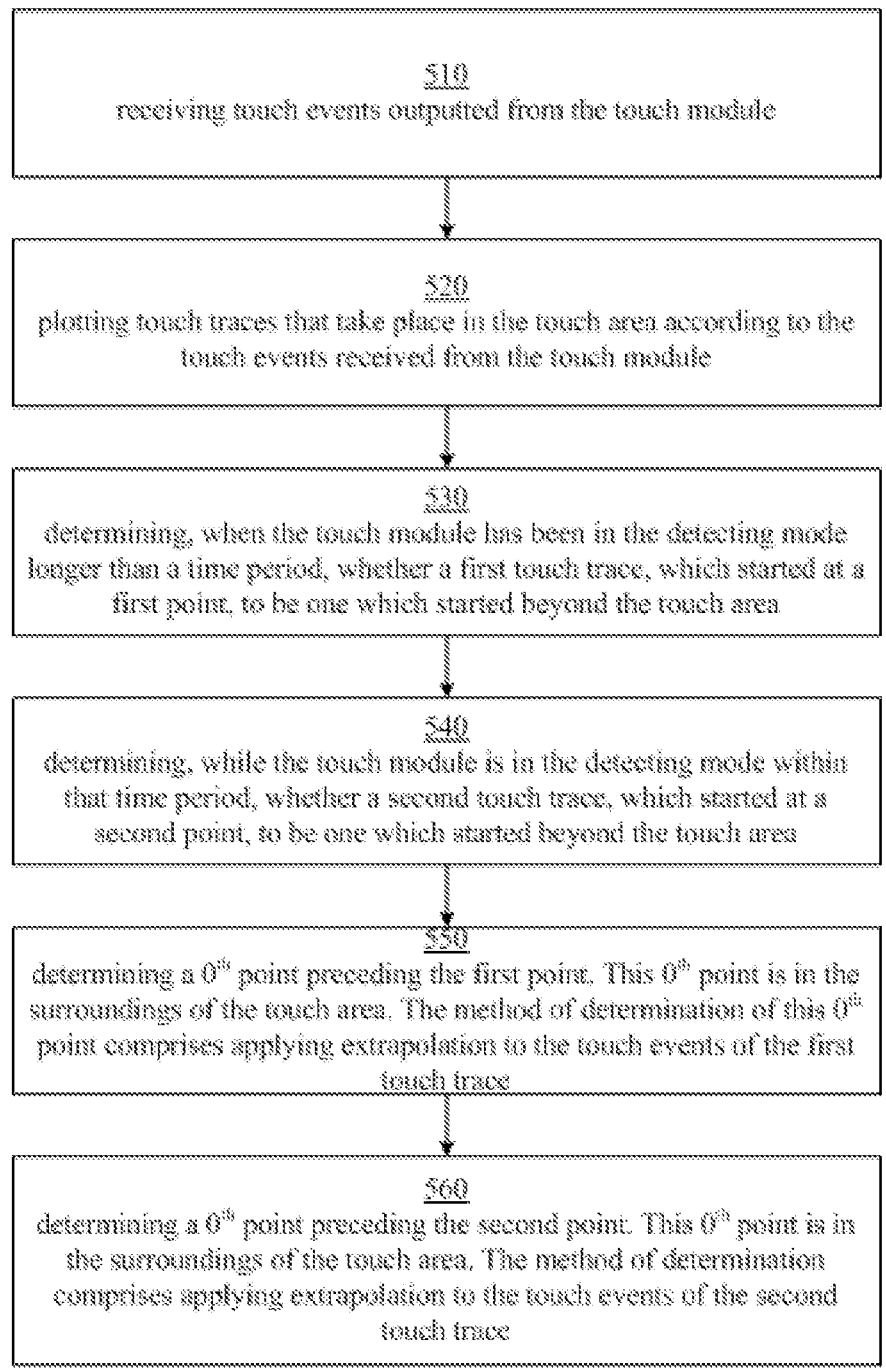
FIG. 5 is a flowchart diagram illustrating a method for detecting touch traces starting beyond the touch area according to one embodiment of the present invention.

Referring to FIG. 5, which is a diagram illustrating a method for detecting touch traces starting beyond a touch area that works with an electronic device to which the provided method is applied. The electronic device comprises a touch module and a processing module electrically coupled with each other. The method comprises: receiving touch events outputted from the touch module (Step 510), wherein the touch events are detected by the touch module as taking or having taken place in the touch area; plotting touch traces that take place in the touch area according to the touch events received from the touch module (Step 520); determining, when the touch module has been in the detecting mode longer than a time period, a first touch trace, which started at a first point, to be one which started beyond the touch area (Step 530); and determining, while the touch module is in the detecting mode within that time period, a second touch trace, which started at a second point, to be one which started beyond the touch area (Step 540). The distance between the first point and the boundary of the touch area is determined to be within a first range, the distance between the second point and the boundary of the touch area is determined to be within a second range, wherein the second range is larger than the first range.

Before Step 510 i.e. before switching to the detecting mode, the touch module is in a non-detecting mode, thus it stops detecting touch events taking place in the touch area. An optional Step 550 can be included after performing Step 530 for determining a $0^{th}$ point preceding the first point. This $0^{th}$ point is in the surroundings of the touch area. The method of determination of this $0^{th}$ point comprises applying extrapolation to the touch events of the first touch trace. An optional Step 560 can be included after performing Step 540 for determining a $0^{th}$ point preceding the second point. This $0^{th}$ point is in the surroundings of the touch area. The method of determination comprises applying extrapolation to the touch events of the second touch trace.

Step 530 can further comprise determining that whether the speed of the first touch trace, provided that it has been determined to have started beyond the touch area, exceeds a first critical speed. Step 540 can further comprise determining that whether the speed of the second touch trace, provided that it has been determined to have started beyond the touch area, exceeds a second critical speed. The first critical speed is a speed of the first touch trace with respect to the boundary of the touch area. The second critical speed is a speed of the second touch trace with respect to the boundary of the touch area.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. An electronic device configured to detect touch traces starting beyond an associated touch area that works with said electronic device, comprising:
   a touch module for detecting touch events taking place in said touch area; and
   a processing module, electrically coupled to said touch module, for plotting touch traces taking place in said touch area according to said touch events outputted from said touch module, wherein when said touch module has been in a detecting mode more than a time period, said processing module determines whether a first touch trace, which started at a first point, started beyond said touch area, wherein while said touch module is in the detecting mode within said time period, said processing module determines whether a second touch trace, which started at a second point, started beyond said touch area, and wherein the distance between said first point and the boundary of said touch area is within a first range, the distance between said second point and the boundary of said touch area is within a second range, said second range being larger than said first range.

2. The electronic device according to claim 1, wherein before switching to the detecting mode, said touch module is in a non-detecting mode where it stops detecting said touch events taking place in said touch area.

3. The electronic device according to claim 1, wherein said processing module determines a $0^{th}$ point preceding said first point on said first touch trace, said $0^{th}$ point being in the surroundings of said touch area, wherein said determination of said $0^{th}$ point comprises applying extrapolation to said touch events of said first touch trace.

4. The electronic device according to claim 1, wherein said processing module determines a $0^{th}$ point preceding said second point on said second touch trace, said $0^{th}$ point being in the surroundings of said touch area, said determination of said $0^{th}$ point comprises applying extrapolation to said touch events of said second touch trace.

5. The electronic device according to claim 1, wherein when said first touch trace is determined to be one which started beyond said touch area, the speed of said first touch trace exceeds a first critical speed, and when said second touch trace is determined to be one which started beyond said touch area, the speed of said second touch trace exceeds a second critical speed.

6. The electronic device according to claim 5, wherein said first critical speed is a speed of said first touch trace with respect to the boundary of said touch area, said second critical speed is a speed of said second touch trace with respect to the boundary of said touch area.

7. An electronic device configured to detect touch traces starting beyond an associated touch area that works with said electronic device, comprising:
   a touch module for detecting touch events taking place in said touch area; and
   a processing module, electrically coupled to said touch module, for plotting touch traces taking place in said touch area according to said touch events outputted from said touch module,
   wherein when said electronic device is in a first mode, said processing module determines whether a first touch trace, which started at a first point, started beyond said touch area,
   wherein when said electronic module is in a second mode, said processing module determines whether a second touch trace, which started at a second point, started beyond said touch area,
   and wherein the distance between said first point and the boundary of said touch area is within a first range, the distance between said second point and the boundary of said touch area is within a second range, said second range being larger than said first range.

8. The electronic device according to claim 7, wherein when said electronic device is in said second mode, said touch module switches back and forth between a detecting mode and a non-detecting mode periodically, and when said electronic device is in said first mode, said touch module stays in said detecting mode.

9. The electronic device according to claim 8, wherein said switching period is corresponding to said second range.

10. The electronic device according to claim 7, wherein said processing module determines a $0^{th}$ point preceding said first point on said first touch trace, said $0^{th}$ point being in the surroundings of said touch area, wherein said determination of said $0^{th}$ point comprises applying extrapolation to said touch events of said first touch trace.

11. The electronic device according to claim 7, wherein said processing module determines a $0^{th}$ point preceding said second point on said second touch trace, said $0^{th}$ point being in the surroundings of said touch area, said determination of said $0^{th}$ point comprises applying extrapolation to said touch events of said second touch trace.

12. The electronic device according to claim 7, wherein when said first touch trace is determined to be one which started beyond said touch area, the speed of said first touch trace exceeds a first critical speed, and when said second touch trace is determined to be one which started beyond said touch area, the speed of said second touch trace exceeds a second critical speed.

13. The electronic device according to claim 12, wherein said first critical speed is a speed of said first touch trace with respect to the boundary of said touch area, said second critical speed is a speed of said second touch trace with respect to the boundary of said touch area.

14. A processing module for detecting touch traces starting beyond an associated touch area that works with said processing module,
   wherein touch events taking place in said touch area are detected by a touch module which is electrically coupled with said processing module,
   wherein said processing module receives said touch events outputted from said touch module, and plots touch traces taking place in said touch area accordingly,
   wherein when said touch module has been in a detecting mode more than a time period, said processing module determines whether a first touch trace, which started at a first point, to be one which started beyond said touch area,
   wherein while said touch module is in the detecting mode within said time period, said processing module determines whether a second touch trace, which started at a second point, to be one which started beyond said touch area, and
   wherein said processing module determines the distance between said first point and the boundary of said touch area to be within a first range, and the distance between said second point and the boundary of said touch area to be within a second range, said second range being larger than said first range.

15. A method for detecting touch traces starting beyond a touch area, comprising:
   receiving touch events outputted from a touch module, wherein said touch events are detected by said touch module as taking place in said touch area;
   plotting touch traces taking place in said touch area according to said touch events received from said touch module;
   determining, when said touch module has been in a detecting mode more than a time period, whether a first touch trace, which started at a first point, to be one which started beyond said touch area; and determining, while said touch module is in the detecting mode within said time period, whether a second touch trace, which started at a second point, to be one which started beyond said touch area, wherein the distance between said first point and the boundary of said touch area is determined to be within a first range, the distance between said second point and the boundary of said touch area is determined to be within a second range, said second range being larger than said first range.

16. The method according to claim 15, wherein before switching to the detecting mode, said touch module is in a non-detecting mode where it stops detecting said touch events taking place in said touch area.

17. The method according to claim 15, further comprising determining a 0th point preceding said first point on said first touch trace, said $0^{th}$ point being in the surroundings of said touch area, said determination of said $0^{th}$ point comprises applying extrapolation to said touch events of said first touch trace.

18. The method according to claim 15, further comprising determining a 0th point preceding said second point on said second touch trace, said $0^{th}$ point being in the surroundings of said touch area, said determination of said $0^{th}$ point comprises applying extrapolation to said touch events of said second touch trace.

19. The method according to claim 15, further comprising, when said first touch trace is determined to be one which started beyond said touch area, the speed of said first touch trace exceeds a first critical speed, and when said second touch trace is determined to be one which started beyond said area, the speed of said second touch trace exceeds a second critical speed.

20. The method according to claim 19, wherein said first critical speed is a speed of said first touch trace with respect to the boundary of said touch area, said second critical speed is a speed of said second touch trace with respect to the boundary of said touch area.

* * * * *